United States Patent Office 3,326,812
Patented June 20, 1967

3,326,812
URANIUM TRIOXIDE-ZIRCONIUM DIOXIDE SOL PROCESS AND PRODUCT
Jean G. Smith and Frederick T. Fitch, Baltimore, Md., assignors to W. R. Grace & Co., New York, N.Y., a corporation of Connecticut
No Drawing. Filed Sept. 23, 1964, Ser. No. 398,766
12 Claims. (Cl. 252—301.1)

This invention relates to uranium trioxide-zirconia aquasols, to colloidal uranium trioxide-zirconia particles, and to a process for producing these compositions. More partciularly, this invention relates to the preparation of uranium trioxide-zirconia aquasols by peptizing aqueous suspensions of a diuranate-hydrous zirconia coprecipitate.

In summary, the process of this invention comprises a method for preparing a highly stable uranium trioxide-zirconium dioxide aquasol comprising the steps of dispersing substantially electrolyte-free, alkaline-precipitated diuranate-zirconia coprecitate in water, and heating the dispersed phase at a temperature within the range of from about 60 to 120° C. while removing cations from the solution until peptization occurs, or by replacing the cations in the solution with hydrogen ions until the solution pH is within the range of from about 5 to 6 and then heating the dispersion at a temperature within the range of from about 60 to 150° C. until peptization occurs.

In summary, the compositions of this invention comprise intimately associated uranium trioxide-zirconium dioxide in the form of particles at least 90 percent of which have a particle size up to 500 millimicrons, and comprising from 1 to 80 mole percent zirconia, as an aquasol and as dried aquasol particles.

The preferred embodiment of the process of this invention is a method for preparing a highly stable uranium trioxide-zirconia aquasol comprising the steps of mixing a solution of a soluble uranyl salt and a soluble zirconium salt, the soluble uranyl salt being selected from the group consisting of uranyl chloride, uranyl nitrate, uranyl formate, uranyl acetate, and mixtures thereof, the soluble zirconium salt being selected from the group consisting of zirconyl chloride, zirconyl nitrate, zirconyl formate, zirconyl acetate and mixtures thereof, with an alkaline precipitating reagent selected from the group consisting of ammonia gas, ammonium hydroxide solution, alkali metal hydroxide, amines having a base constant, $K_b$, of greater than $1 \times 10^{-8}$, and mixtures thereof, to form a coprecipitate of the corresponding diuranate and zirconia; separating the diuranate-zirconia coprecipitate from the solution and washing it substantially free from electrolytes, by first washing with a weak solution of the precipitant and preferably by first washing with a weak ammonia solution followed by a water wash; redispersing the substantially electrolyte-free diurante-zirconia coprecipitate in sufficient water to provide a concentration of from 1 to 12 weight percent solids, preferably a concentration equivalent to about 2.5 to 10 grams of total oxide per 100 ml. of suspension; mixing the diuranate-zirconia dispersion with a cation exchange resin in the hydrogen form; heating the resin-dispersion mixture within the range of from about 60 to 120° C. until peptization occurs, preferably for at least one hour at a temperature within the range of from about 80 to 110° C.; and separating the resin from the uranium trioxide-zirconia aquasol produced.

The uranium oxide sols are of prime interest in the preparation of ceramic nuclear reactor fuel elements. Fuel elements prepared from uranium oxide sols have the advantage of higher mechanical strength and lower sintering temperatures than those produced from conventional ceramic powders. Zirconia, with its low neutron cross-section, is an important diluent in reactor fuel elements. Therefore, it is advantageous to incorporate zirconia into the sol particles in a very intimate association whereby a uniform distribution of zirconia can be achieved in the final ceramic. The production of sintered microspheres from uranium dioxide sol particles has been previously described. The uranium dioxide aquasol is dispersed in an immiscible solvent and dried, producing a uranium dioxide microsphere. The resulting microspheres are then sintered to near theoretical density by heating at temperatures above about 1200° C. in an atmosphere of hydrogen. Sols and dried compositions containing uranium trioxide and zirconia offer several advantages over the respective uranium dioxide sol particles in the production of uranium dioxide-zirconia sintered microspheres. Most significantly, microspheres derived from uranium trioxide sinter at lower temepratures. Also, since the sols can be prepared directly from uranyl salts by the process of this invention, the necessity for the previously employed uranyl to uranous reduction step is eliminated. Furthermore, in the production of microspheres from aqueous sols by solvent dehydration techniques, uranium trioxide-zirconia droplets can be dehydrated to form microspheres over a wider range of process conditions.

It is one object of this invention to provide a method for making uranium trioxide-zirconia aquasols.

It is another object of this invention to provide a composition of matter consisting essentially of uranium trioxide-zirconia in an intimate association, having a particle size up to one micron, the concentration of the zirconium dioxide being from 1 to 80 mole percent based on the total moles of uranium trioxide and zirconium dioxide, both as a dried powder and as a dispersed phase in an aquasol.

The uranium trioxide-zirconia dioxide aquasol is formed by peptization of freshly precipitated diuranate-hydrous zirconia in an aqueous suspension by removal of cations from the system and the substitution therefor of hydrogen ions. The diuranate-zirconia precipitate is obtained by mixing a solution containing a soluble uranyl salt and a soluble zirconium salt with an alkaline precipitating agent.

Any soluble uranyl salt and zirconium salt can be used to make the solution. Uranyl and zirconyl salts of monovalent acids are preferred. Examples of suitable uranyl salts are uranyl chloride, nitrate, formate, acetate, sulfate and mixtures thereof. Examples of suitable zirconium salts are zirconyl chloride, nitrate, formate, acetate, sulfate, and mixtures thereof. Preferably, the solution containing the uranium zirconium salts is diluted to a concentration equivalent to from 1 to 20 grams of total oxide per 100 milliliters of solution. The optimum total concentration is about from 5 to 10 grams of total oxide per 100 milliliters of solution. From 1 to 80 mole percent of the salt can be a zirconium salt. The alkaline precipitating agent can be any conventional water-soluble material which provides the requisite alkalinity for rapid precipitation. For example, the alkaline precipitating agent can be ammonia, an aqueous ammonia solution, an alkali metal hydroxide, an amine having a base constant, $K_b$, of greater than $1 \times 10^{-8}$, and mixtures thereof. Examples of suitable amines include methyl amine, ethyl amine, hydrazine, etc.

When the solution containing these zirconium and uranium salts is mixed with the alkaline precipitating agent, a diuranate-hydrous zirconia coprecipitate is obtained which contains cations corresponding to the particular alkaline precipitating agent employed. The diuranate-zirconia precipitate is separated from the solution by filtration, for example, and is washed substantially free from electrolytes. The preferred method for washing the precipitate free from electrolytes is by first washing the precipitate with a dilute ammonium hydroxide solution, preferably about 5 N ammonium hydroxide solution, followed by a water wash. Preliminary washing with a dilute solution of the precipitant can be employed. The final water wash is continued until the precipitate begins to peptize and pass through the filter.

The electrolyte-free diuranate-zirconia precipitate is then redispersed in water to the desired concentration. A dispersion concenrtation equivalent to about from 1 to 12 grams of total oxide per 100 milliliters of dispersion can be employed. The preferred concentration is from about 2.5 to 10 grams of total oxide per 100 milliliters of dispersion.

The diuranate-zirconia dispersion is then peptized to form a uranium trioxide aquasol by removing the cations of the solution while heating the dispersion. The cation exchange can be obtained by the use of ion exchange resins or by electrodialysis techniques.

With the ion exchange resin method, the aqueous dispersion of the diuranate is exchanged with a cation exchange resin in the hydrogen form. Suitable resins are Amberlite IR–120 and Dowex 50, for example. Preferably, the dispersion is heated resin employed is just sufficient to complete peptization of the system. Peptization can be determined by simple visual examination, for example. The cation exchange with the ion exchange resin is more rapid at the elevated temperatures present during the heating, and the sol is produced in the single step. Heating at temperatures within the range of from about 60 to 150° C. is suitable. However, if ion exchange resins lacking the necessary thermal stability for use at the higher temperatures are employed, a maximum temperature of 110° C. can be employed. The preferred peptization conditions with simultaneous heating and ion exchange comprise heating for about at least one hour at a temperature within the range of from about 80 to 110° C.

Alternatively, the ion exchange can be completed with the ion exchange resin prior to the heating step. The quantity of ion exchange resin employed is sufficient to just provide complete peptization during the heating step, a quantity which will provide a dispersion pH within the range of from about 5 to 6 prior to the heating step. Following the ion exchange, the dispersion is heated at the same temperatures as described with respect to the simultaneous ion exchange-heating technique. Preferably, the dispersion is separated from the ion exchange resin prior to the heating step, for example by filtration.

In the technique of ion exchange by electrodialysis, the dispersion is circulated through the anode compartment of an electrodialyzer. Deionized water is passed through the cathode compartment. The anode and cathode compartments are separated by a cation exchange membrane such as a Nepton CR–61 membrane. When an electrical potential is applied between the electrodes, which are constructed of inert materials such as platinum or carbon, cations migrate through the membrane toward the cathode. This results in cation exchange of the diuranate. In this process, the ion exchange can also occur simultaneous with or before the heating step. However, since the ion exchange membranes are even less thermally stable than the ion exchange resins, dispersions having a high temperature cannot be passed through the anode compartment of the electrodialyzer. For simultaneous heating and ion exchange, the dispersion can be heated in a reservoir and a portion thereof can be removed, cooled, passed through the anode compartment for ion exchange, and then returned to the reservoir of heated dispersion. Therefore, because of the difficulties of simultaneous ion exchange and heating in the electrodialysis technique, the sequential exchange-heating procedure is preferred. By this technique the diuranate dispersion is subjected to ion exchange in the anode compartment of the electrodialyzer until the dispersion of pH is within the range of from about 5 to 6, i.e., until the dispersion will be just completely peptized during the subsequent heating step. The heating temperatures and times suitable in the electrodialysis techniques are the same as described with respect to the ion exchange resin techniques, heating at temperatures within the range of from 60 to 150° C. until peptization occurs.

The product uranium trioxide-zirconia aquasol is yellow in color and stable for at least several months. It does settle slowly on standing but is readily redispersed by mild agitation. As shown by electron micrographs, above about 90 percent of the particles have a size less than 500 millimicrons with a small portion of the particles having sizes ranging up to about one micron. These particles have a substructure consisting of a network of strongly associated cubes, open-centered and averaging about 10 millimicrons on a side. Particle density apears uniform in the micrograph, proof that the uranium trioxide and zirconia, which alone have different densities, are intimately associated within the sol particles. The term intimately associated is used to indicate the product micelles have a uniform density under electron microscope examination. The surface charge of the particles shifts from negative to positive as the amount of the zirconium dioxide is gradually increased.

The uranium trioxide-zirconia aquasols may be prepared at any desired composition between 1 and 80 mole percent of zirconia. The sol is stable over a pH range of about 5.0 to 8.0. For maximum stability, the preferred pH range is from 5.5 to 7.0. Within the maximum stability, specific conductance of the aquasol at 25° C. ranges from $5 \times 10^{-3}$ to $1 \times 10^{-6}$ mho/cm. The preferred conductance range is from about $1 \times 10^{-4}$ to $5 \times 10^{-5}$ mho/cm. The sol concentration can be increased to 15 grams of total oxide per 1090 ml. of suspension by centrifugation and redispersion in a reduced volume of liquid. The sol particles can be obtained as a dry powder by centrifugation, vacuum evaporation, extraction, etc.

The sol pH can be measured with a Beckman Model G pH meter, and the specific conductance can be measured with an Industrial Instruments conductivity bridge, Model DC 16B1.

Relative kinematic viscosity $N_k$ of the sols was determined from the drain time of the sol $t_s$, and a drain time of water, $t_w$, in an Ostwald viscometer according to the equation:

$$N_k = \frac{t_s}{t_w}$$

The invention is further illustrated by the following specific but non-limiting examples.

*Example I*

In this example, a mixed oxide sol containing 64 mole percent zirconia in the dispersed phase was formed.

A 156 ml. quantity of uranyl chloride solution containing the equivalent of 50 g. of $UO_2$ per 100 ml. was mixed with 97.5 ml. of zirconyl chloride solution containing the equivalent of 20 g. of $ZrO_2$ per 100 ml. and diluted to a final volume of 1680 ml. The coprecipitate of ammonium diuranate and hydrous zirconia was formed by adding 277 ml. of 5 N ammonia to the mixed chloride solution. The precipitate was separated, washed with a 5 N ammonia solution, and then with water. The precipitate was then slurried in water to a volume of 975 ml. The total oxide concentration was 10 grams per 100 ml. of suspension. The slurry was then heated for 3.5 hours at 80° C. in the presence of 550 ml. of Amberlite IR–120 cation exchange resin the hydrogen form. A yellow sol was formed, and was separated from the ion exchange resin by filtration through glass wool.

The sol properties were as follows:

| | |
|---|---|
| pH | 6.65 |
| Specific conductance, mho/cm. | $3.83 \times 10^{-5}$ |
| Density, gm./cc. | 1.0293 |
| Concentration, wt. percent total oxide | 3.57 |
| Concentration $ZrO_2$, mole percent in dispersed phase | 64.1 |
| Relative kinematic viscosity | 1.54 |

Electrophoresis indicated that the sol particles carried a strong positive charge. This was a consequence of the high zirconia content of the particles. Electron micrographs showed that the zirconia was distribute so intimately that the composition appeared homogeneous throughout. No separate areas of zirconia or of uranium trioxide were apparent within the sol.

*Example II*

In this example a sol with 42 mole percent of zirconia in the dispersed phase was obtained from an ammonium diuranate-hydrous zirconia coprecipitate.

A mixed uranyl-zirconyl chloride solution was prepared by mixing 191 ml. of uranyl chloride solution containing the equivalent solution containing the equivalent of 40.8 g. $UO_2$ per 100 ml. with 97.5 ml. of zirconyl chloride solution containing the equivalent of 20.0 g. $ZrO_2$ per 100 ml. The mixed chloride solution was added slowly, with strong stirring, to 277 ml. of 5 N ammonia. The resulting precipitate was separated, washed free from chloride ions with a 5 N ammonia solution, washed with water, and then slurried to a total volume of 1300 ml. The concentration of the slurry was, at this point, 7.5 grams of oxide per 100 ml. of slurry. The system was then refluxed for 2 hours at 100° C. in the presence of 200 ml. of Amberlite IR–120 cation exchange resin in the hydrogen form. The product uranium trioxide-zirconia dioxide aquasol was separated from the resin by filtration through glass wool. The pH of the product sol was 7.59. To improve stability, the pH was adjusted to 6.47 with 4 drops of 4 N hydrochloric acid.

The final sol properties were as follows:

| | |
|---|---|
| pH | 6.47 |
| Specific conductance, mho/cm. | $6.58 \times 10^{-5}$ |
| Density, gm./cc. | 1.0341 |
| Concentration, wt. percent total oxide | 5.52 |
| Concentration, $ZrO_2$, mole percent in dispersed phase | 41.8 |

This sol, as determined by the electrophoresis experiment, carried a weak negative charge at the particle surface. Particle composition was uniform as in the product of the Example I.

Obviously, many modifications and variations of this invention may be made without departing from the essence and scope thereof, and only such limitations should be applied as are indicated in the appended claims.

We claim:

1. A process for preparing a uranium trioxide-zirconium dioxide aquasol comprising the steps of:
   (a) dispersing an alkaline precipitated diuranate-zirconia coprecipitate in water, and
   (b) removing cations from the solution and heating the dispersion at a temperature within the range of from about 60 to 150° C. until peptization occurs.

2. A process for preparing a uranium trioxide-zirconium dioxide aquasol comprising the steps of:
   (a) dispersing an alkaline precipitated diuranate-zirconia coprecipitate in water, and
   (b) removing cations from the solution while heating the dispersion at a temperature within the range of from about 60 to 150° C. until peptization occurs.

3. A process for preparing a uranium trioxide-zirconium dioxide aquasol comprising the steps of:
   (a) dispersing an alkaline precipitated diuranate-zirconia coprecipitate in water,
   (b) removing cations from the solution until the dispersion pH is within the range of from about 5 to 6, and
   (c) heating the dispersion at a temperature within the range of from 60 to 150° C. until peptization occurs.

4. A process for preparing a uranium trioxide-zirconium dioxide aquasol comprising the steps of:
   (a) mixing a water dispersion of an alkaline-precipitated diuranate-zirconia coprecipitate with a cation exchange resin in the hydrogen form,
   (b) heating the resin-dispersion mixture at a temperature within the range of from about 60 to 150° C. until peptization occurs, and
   (c) separating the uranium trioxide-zirconium dioxide aquasol formed from the ion exchange resin.

5. The process of claim 4 wherein the resin-dispersion mixture is heated for at least about one hour at a temperature within the range of from about 80 to 110° C. to form uranium trioxide-zirconium dioxide aquasol.

6. A process for preparing a uranium trioxide-zirconium dioxide aquasol comprising the steps of:
   (a) mixing a solution containing a soluble uranyl salt and a soluble zirconyl salt with an alkaline precipitating agent to form a diuranate-zirconia coprecipitate,
   (b) separating the coprecipitate from the solution and washing it substantially free from electrolytes,
   (c) redispersing the washed coprecipitate in water,
   (d) mixing the diuranate-zirconia dispersion with a cation exchange resin in the hydrogen form,
   (e) heating the resin-dispersion mixture at a temperature within the range of from about 60 to 150° C. until peptization occurs, and
   (f) separating the resin from the uranium trioxide-zirconium dioxide aquasol produced.

7. The process of claim 6 wherein the diuranate-zirconia coprecipitate is dispersed in sufficient water to provide a concentration of from about 1 to 12 wt. percent total oxide.

8. The process according to claim 6 wherein the resin-dispersion mixture is heated at a temperature within the range of from about 80 to 110° C. for at least about one hour to form the uranium trioxide-zirconium dioxide aquasol.

9. The process according to claim 6 wherein the uranyl salts and zirconyl salts are salts of acids having monovalent anions.

10. The process according to claim 6 wherein the alkaline precipitating agent is selected from the group consisting of ammonia, ammonium hydroxide solution, alkali metal hydroxide, an amine having a base constant, $K_b$, of greater than $1 \times 10^{-8}$, and mixtures thereof.

11. An aquasol composition containing intimately associated uranium trioxide-zirconium dioxide particles, at least 90% of the particles having sizes up to about 500 millimicrons, the portion of zirconium dioxide in the dispersed phase being from about 1 to 80 mole percent.

12. A composition of matter consisting essentially of intimately associated uranium trioxide-zirconium dioxide particles having a size up to one micron, the zirconium dioxide content being from about 1 to 80 mole percent of the combined uranium and zirconium oxides.

References Cited

UNITED STATES PATENTS 3,024,199   3/1962   Pasfield _____ 252—301.1

CARL D. QUARFORTH, *Primary Examiner.*

BENJAMIN R. PADGETT, *Examiner.*

S. J. LECHERT, JR., *Assistant Examiner.*